United States Patent Office.

FREDERICK C. KRAUSE, OF NEW YORK, N. Y., ASSIGNOR TO SAMUEL A. WALSH, OF SAME PLACE.

Letters Patent No. 110,249, dated December 20, 1870.

IMPROVEMENT IN CLAY RETORTS FOR THE MANUFACTURE OF GAS.

The Schedule referred to in these Letters Patent and making part of the same.

*To all whom it may concern:*

Be it known that I, FREDERICK C. KRAUSE, of the city of New York, in the county of New York and State of New York, have invented a new and useful Improvement in the Construction of Clay Retorts used in Manufacturing Gas and for other purposes; and I do declare that the following is a full, clear, and exact description thereof.

My invention is in improvement in the construction of clay retorts, and has for its objects the prevention of the escape from the retort of the gases formed or generated therein, and also preventing such retorts cracking from changes in temperature, and thereby being rendered practically useless.

Clay retorts have been often used in the manufacture of gas, but they have been found practically of comparatively but little value, as they permit the escape, to a greater or lesser degree, of the gases generated within them, and are also very liable to crack and thus be rendered useless. To obviate the former objection such retorts have sometimes been made with a vitrified surface, but even when so constructed they have been liable to crack by changes of temperature, and when so cracked they become, like other clay retorts, comparatively or wholly useless.

My invention consists in making the retort, as to both its external and internal surfaces, of clay, properly tempered and manipulated, and interposing between such surfaces a composition which will vitrify, whereby all escape of gas is effectually prevented, and injury from the cracking of the surfaces is also almost, if not entirely, overcome.

The retort may be made in any desired form, but the ordinary D-shape is preferred, and the retort may best be two or three inches in thickness.

The inner clay portion is first laid up, and then over such portion is spread, of a thickness usually about one-sixteenth of an inch, a composition of materials which will vitrify by the heat applied in baking the retort, and on the outside of or over such composition or preparation is laid another coating or layer of clay. The whole retort, thus built up, is then put on the oven and treated in the ordinary manner. The heat required to properly bake or prepare the retort for use vitrifies the composition placed between the two portions of clay, thus making the middle portion a solid compact body, through which no gas can pass.

The composition which I consider the best adapted for use for forming the central or middle portion of the retort is composed of the following materials, mixed in substantially the following proportions: kaolin, forty parts; silica, forty parts; and feldspar, twenty parts; but other substances that will vitrify at the temperature required to bake the retort may be made use of. Such composition may be made of a consistency to be applied to the clay foundation by means of a trowel or similar instrument; but I consider it preferable to make the composition sufficiently fluid so it can be applied with a brush, as it can thus be applied more rapidly and more uniformly. Such composition, when vitrified, is solid and not porous, and thus prevents any escape of gases from the retort; and its position in the retort, between the clay surfaces, so that the air cannot come in contact with it when the retort is charged, prevents all danger or possibility of its becoming cracked from changes of temperature consequent upon charging.

What I claim as my invention is—

1. A clay retort, having a vitrified or non-porous portion within or between two clay surfaces, substantially as and for the purposes set forth.

2. In the construction of clay retorts, the use of kaolin, silica, and feldspar, combined substantially in the proportions, and placed within the body of clay substantially as and for the purposes set forth.

FRD. C. KRAUSE

Witnesses:
S. D. LAW,
A. T. GURLITZ.